No. 736,169.

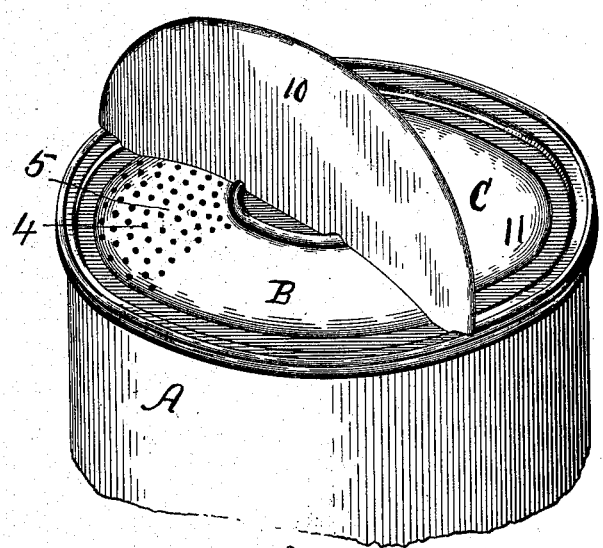
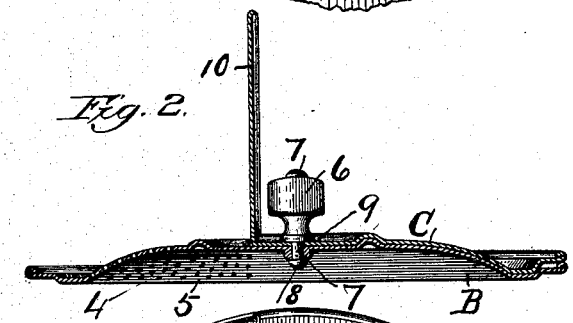
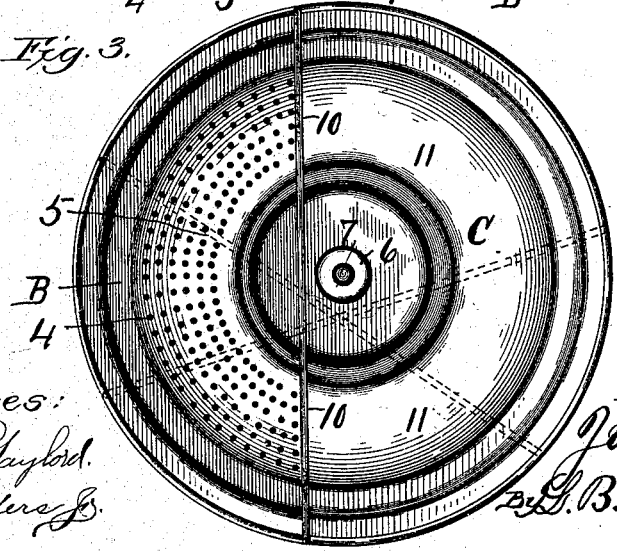

Patented August 11, 1903.

UNITED STATES PATENT OFFICE.

JULIA STONE, OF CHICAGO, ILLINOIS.

COVER FOR CULINARY VESSELS.

SPECIFICATION forming part of Letters Patent No. 736,169, dated August 11, 1903.

Application filed August 17, 1901. Serial No. 72,352. (No model.)

*To all whom it may concern:*

Be it known that I, JULIA STONE, a citizen of the United States, residing at Chicago, in the county of Cook and State of Illinois, have invented certain new and useful Improvements in Covers for Culinary Vessels; and I do hereby declare the following to be a full, clear, and exact description of the invention, such as will enable others skilled in the art to which it appertains to make and use the same.

This invention relates to an improved cover for culinary and other vessels, and has for its object to provide a device of this character that will readily permit of the liquid contents of a vessel being discharged without the removal or partial displacement of the cover and at the same time provides a complete protection for the hands from being scalded by the escaping steam.

Another feature and advantage of this improvement is that a greater or less vented surface may be presented, in accordance with the nature of the liquid and solid contents of the vessel, and the same prevented from boiling over.

It is a very difficult matter to successfully pour off the boiling liquid contents from a vessel provided with the cover in common use without the usual danger of scalding or burning the hands and allowing a portion of the solid contents to escape.

The invention presented in this application obviates the objectionable features of the ordinary cover for vessels and permits of the liquid body being discharged with facility.

In the accompanying drawings, Figure 1 is a view in perspective of the upper part of a vessel, showing the improved cover in place. Fig. 2 is a transverse section of the cover, and Fig. 3 is a plan of the same.

The vessel A illustrated in the drawings is of the usual cylindrical form and is provided with a loose cover B, having a part of its surface perforated. The loose detachable cover B is of the ordinary construction, with the difference that a segmental part of the cover is provided with a number of perforations 4, providing a straining-surface 5, through which the liquid contents of a vessel may be discharged and the solid contents retained bodily. The area of the straining-surface and the diameter and number of the perforations may be proportionately varied as required by circumstances.

A supplemental cover C is rotatably attached to the main cover B and may be conveniently turned thereon in either direction in covering or uncovering the perforated surface.

The finger-grasp or knob 6 is of the ordinary character and is rigidly secured to the main cover by a pin 7, passing therethrough and having its lower extended and riveted to the under side of the cover, as at 8. The extended end of the pin 7 also passes through the supplemental cover C and loosely retains the same in its proper position relative to the main cover and provides a pivot-bearing on which the supplemental cover may be adjusted in carrying out the objects of the invention. The pin 7 will project just far enough from the finger-grasp to pass through the combined thickness of the two covers and bring the lower end of the knob to a light shoulder bearing on the supplemental cover, as at 9, and provides for a free rotation thereof and at the same time prevents an upward separating movement from the main cover.

A part of the supplemental cover is turned upward at right angles and occupies the rigid position shown. This integral turned-up part forms a permanent shield 10 for the protection of the hands from escaping steam in the operation of discharging boiling liquid from the vessel. The supplemental cover is rotated by grasping the top edge of the shield, and when the liquid contents is to be poured off the cover should be rotated to the position shown in Fig. 3, uncovering the perforated surface and bringing the shield into position to protect the hand grasping the knob in holding the cover on. When the perforations are to be covered, the supplemental cover is turned to bring the imperforated surface 11 thereof over the straining-surface, and thereby providing a tight imperforate cover.

Another important advantage of this device is that a greater of less proportion of the perforated or straining surface may be uncovered or exposed in regulating the operation of cooking and boiling, as some articles and substances boil over much easier than others, and with this knowledge in mind it is a very simple matter to uncover one or more rows of vent-perforations for the gradual escape of steam, and boiling over will be thereby prevented. When a fine straining-surface is required, a piece of wire-cloth may be inserted in the main cover instead of using the perforations.

The dotted lines in Fig. 3 indicate different positions of the shield, which may be set at any point within the range of circumference of the supplemental cover.

Having thus described my invention, what I claim, and desire to secure by Letters Patent, is—

1. In a cover for culinary vessels, the combination with the main cover provided in a portion of its surface with a number of perforations, of a supplemental cover pivotally attached to the main cover so as to freely rotate thereon in either direction and provided with a rigid upturned shield between the hand-grasp and the perforated surface of the main cover when the perforated surface is uncovered, said shield being integral with the said supplemental cover and extending quite across the top of the vessel substantially as and for the purpose set forth.

2. In a cover for culinary vessels, the combination with the main cover having both a perforate and an imperforate surface, of a supplemental cover pivotally attached thereto and provided with an integral hand-protecting shield turned upwardly at right angles and adapted to be rotated to bring said shield into position between the pivotal point and the perforated surface of the main cover, substantially as described.

3. A cover for culinary vessels, comprising a main cover having both perforate and imperforate surfaces, an imperforate supplemental cover rotatably mounted thereon and having a part thereof corresponding to the perforated surface of the main cover turned upwardly at approximately right angles, and a hand-grasp, forming a central pivotal connection between said covers, substantially as and for the purpose set forth.

In testimony whereof I affix my signature in presence of two witnesses.

JULIA STONE.

Witnesses:
L. B. COUPLAND,
L. H. WHITNEY.